US010318911B1

(12) United States Patent
Cynamon et al.

(10) Patent No.: US 10,318,911 B1
(45) Date of Patent: Jun. 11, 2019

(54) PERSISTENCELESS BUSINESS PROCESS MANAGEMENT SYSTEM AND METHOD

(71) Applicant: JPMorgan Chase Bank, N.A., New York, NY (US)

(72) Inventors: Nathan Cynamon, Brooklyn, NY (US); Arkady Perepelyuk, Brooklyn, NY (US); Shahriar Taj, Dix Hills, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1090 days.

(21) Appl. No.: 13/897,848

(22) Filed: May 20, 2013

Related U.S. Application Data

(60) Provisional application No. 61/782,681, filed on Mar. 14, 2013.

(51) Int. Cl.
G06Q 10/06 (2012.01)

(52) U.S. Cl.
CPC ................... G06Q 10/067 (2013.01)

(58) Field of Classification Search
USPC ......................................... 705/348
See application file for complete search history.

(56) References Cited

U.S. PATENT DOCUMENTS

| 7,249,157 | B2 | 7/2007 | Stewart et al. |
| 7,653,562 | B2 | 1/2010 | Schulz et al. |
| 7,890,448 | B2 | 2/2011 | Norse et al. |
| 8,010,940 | B2 | 8/2011 | van Wyk et al. |
| 8,041,760 | B2 | 10/2011 | Mamou et al. |
| 8,060,553 | B2 | 11/2011 | Mamou et al. |
| 8,181,238 | B2 | 5/2012 | Holar et al. |
| 8,457,996 | B2 * | 6/2013 | Winkler ................. G06Q 10/00 705/348 |
| 2006/0136555 | A1 * | 6/2006 | Patrick ................ H04L 29/0602 709/203 |
| 2007/0088970 | A1 * | 4/2007 | Buxton ............... G06F 11/1471 714/2 |

(Continued)

FOREIGN PATENT DOCUMENTS

WO WO 2001/061596 8/2001

Primary Examiner — Andrew B Whitaker
(74) Attorney, Agent, or Firm — Greenblum & Bernstein, P.L.C.

(57) ABSTRACT

Embodiments of the present invention allow for a persistenceless BPM system capable of operating with external state and business context data stores managed by client-side applications. Operating without a state data store within the system, the persistenceless BPM system delegates the responsibility of managing and storing of the state persistence data to the client applications and relies on event message flows to communicate all relevant process state transactions to the client applications. Accordingly, state data is stored in the same data store as the relevant business context data. In the event of a system failure, the process instances are restored from the outsourced data store managed by the client application. Recoverability of operations is improved as there is no need for data reconciliation between two or more data distinct stores. Overall, embodiments of the present invention improve system performance and scalability as many unnecessary costly operations are eliminated either partially or completely.

18 Claims, 6 Drawing Sheets

(56) References Cited

U.S. PATENT DOCUMENTS

| | | | |
|---|---|---|---|
| 2007/0265900 A1* | 11/2007 | Moore | G06Q 10/06 |
| | | | 705/7.12 |
| 2008/0114792 A1* | 5/2008 | LaMonica | G06F 17/30575 |
| 2009/0089078 A1* | 4/2009 | Bursey | G06Q 10/101 |
| | | | 705/300 |
| 2010/0205616 A1* | 8/2010 | Lai | G06F 9/485 |
| | | | 719/320 |
| 2011/0239126 A1 | 9/2011 | Erickson, Jr. et al. | |
| 2012/0030573 A1* | 2/2012 | Balko | G06F 9/4426 |
| | | | 715/735 |
| 2012/0303396 A1* | 11/2012 | Winkler | G06Q 10/00 |
| | | | 705/7.11 |
| 2013/0018702 A1* | 1/2013 | Smith | G06Q 10/06 |
| | | | 705/7.36 |

\* cited by examiner

PERSISTENCELESS BUSINESS PROCESS MANAGEMENT SYSTEM AND METHOD

CROSS-REFERENCE TO RELATED APPLICATION

This patent application claims priority under 35 U.S.C. 119(e) to provisional utility application 61/782,681, filed Mar. 14, 2013, which is hereby incorporated by reference.

FIELD OF THE INVENTION

The invention is generally directed to an improved Business Process Management (BPM) system and more particularly, to a persistenceless BPM system capable of operating with external state and business context data stores managed by client-side applications.

BACKGROUND OF THE INVENTION

Business Process Management (BPM) is a holistic management approach utilized by many organizations to optimize and maintain efficiency and effectiveness across departments and teams. BPM allows members of organizations to model, execute and monitor business processes in a systematic manner to accomplish any number of desired organizational goals and functions. A business process may be modeled, for instance, as a series of interrelated tasks, where the accomplishment of all tasks results in the accomplishment of the overall activity.

Upon implementation, conventional BPM solutions may provide business members with assigned tasks. Furthermore, business context information necessary to accomplish these active tasks, such as customer, inventory and logistic data and requirements, may be gathered from sources internal and external to the BPM system and presented as context information with the tasks assigned. Business members may then effectively and efficiently execute the assigned tasks and interact with the system to provide task results. For instance, a team of business personnel may be presented with a number of tasks related to the validation of the net asset value of a portfolio, along with business context information such as closing prices, corporate news relevant to the validation process, and delivery deadlines. The assigned tasks and the business context data are ordinarily be saved in data stores built and managed by the client application (i.e., at the "client side").

Conventional BPM systems further manage in real time the state of all processes in the BPM system. Thus, the statuses of each task and each business process may be tracked by conventional BPM systems as they are initiated, processed and completed. As one advantage, the tracking of process states allows BPM systems to recover the system and the business processes to the active states just prior to any system failure.

However, whereas business context data is stored in a data store at client-side applications, state data is conventionally stored at and managed by the BPM system. As an effect, the BPM system and the business-side applications must constantly synchronize and merge information across multiple data stores during normal business operations. The accuracy of the stored data, as a result, is in constant flux and is often considered unreliable. Furthermore, the performances of the BPM system and the client slide applications are harmfully impacted as much processing power is consumed by the synchronization operations. Likewise, network bandwidth is consumed by the synchronization data communicated to and from each system. In addition, the use of multiple data stores that are physically and/or logically separated from one another further increases the complexity of system recovery upon system failure. As a result, recovery procedures are sometimes not accurate and, in certain cases, fail themselves.

Therefore, an improved solution for maintaining and tracking the business process state data and the business context data is necessary. A solution should overcome the deficiencies of currently available persistence BPM systems and meet the needs of business architects and their organizations.

SUMMARY OF THE INVENTION

Accordingly, an improved BPM system is disclosed that overcomes the shortcomings of currently available persistence BPM systems. An aspect of the present invention is a persistenceless business process management system that includes a BPM engine that does not manage state data associated with business process instances. The BPM engine may be configured to perform, using at least one processor, a number of operations, including initializing a business process instance in accordance with a previously generated business process definition and communicating an initialization message to a client application connected to an application and state data store. The initialization message may include first state data to be stored at the application and state data store. Furthermore, the BPM engine may be configured to generate a first activity for business execution in accordance with the initialized business process instance and to communicate a first activity message to the client application containing the first activity and second state data to be stored at the application and state data store. In at least one embodiment, the business process instance state information is managed by the client application and the client application is external to the persistenceless BPM system.

The BPM engine may be further configured to communicate a restoration request message in response to a system failure detected at the BPM engine and receive restoration state information in response to the restoration request message. Accordingly, a restoration of the business process instances is performed at the BPM system based on the restoration state information received. In one embodiment, the restoration request message may cause the client application to retrieve the first state data and/or the second state data stored at the application and state data store and generate a restoration state information file accordingly. The BPM engine may restore the BPM system in accordance with the first state data and/or the second state data contained in the restoration state information file.

In at least one embodiment, the business process instances at the BPM system are restored by replaying the processing of the business process instance in accordance with the business process definition and the restoration state information. The replaying procedure may include reinitializing the business process instance in accordance with the previously generated business process definition and generating activities for business execution in accordance with the initialized business process instance. Furthermore, the business process restoration state information may be processed to determine the completion of the generated activities and in response, additional activities may be generated in accordance with the business process definition. The steps of processing the state information to determine activity completion and generating of additional activities in response may repeat until the state of the reinitialized business process instance matches the state of the business process instance just prior to the system failure.

As another aspect of the present invention, a method for operating a persistenceless business process management system is disclosed. The method includes initializing, using at least one processor, a business process instance in accordance with a previously generated business process definition and communicating an initialization message to a client application connected to an application and state data store. Furthermore, a first activity for business execution is generated using the at least one processor in accordance with the initialized business process instance and a first activity message is communicated. The initialization message that is communicated may contain the first state data while the first activity message may contain the first activity and second state data to be stored at the application and state data store.

BRIEF DESCRIPTION OF DRAWINGS

The present invention will now be described, by way of example only, with reference to the accompanying Figures, in which.

The following describes in detail various embodiments of the present invention. One of ordinary skill in the art would understand that standard programming and engineering techniques may be used to produce such embodiments including software, firmware, hardware, or any combination thereof to implement the disclosed subject matter. The attached figures depict exemplary embodiments and are meant to be understood in view of the details disclosed herein.

DETAILED DESCRIPTION OF THE INVENTION

Embodiments of the present invention allow for a persistenceless BPM system. Operating without a state data store within the system, a persistenceless BPM system delegates the responsibility of managing and storing the state persistence data to the client applications and relies on event message flows to communicate all relevant process state transactions to the client applications. Accordingly, state data is stored in the same data store as the relevant business context data. In the event of a system failure, the process instances are restored from the outsourced data store managed by the client applications.

Figure 1:
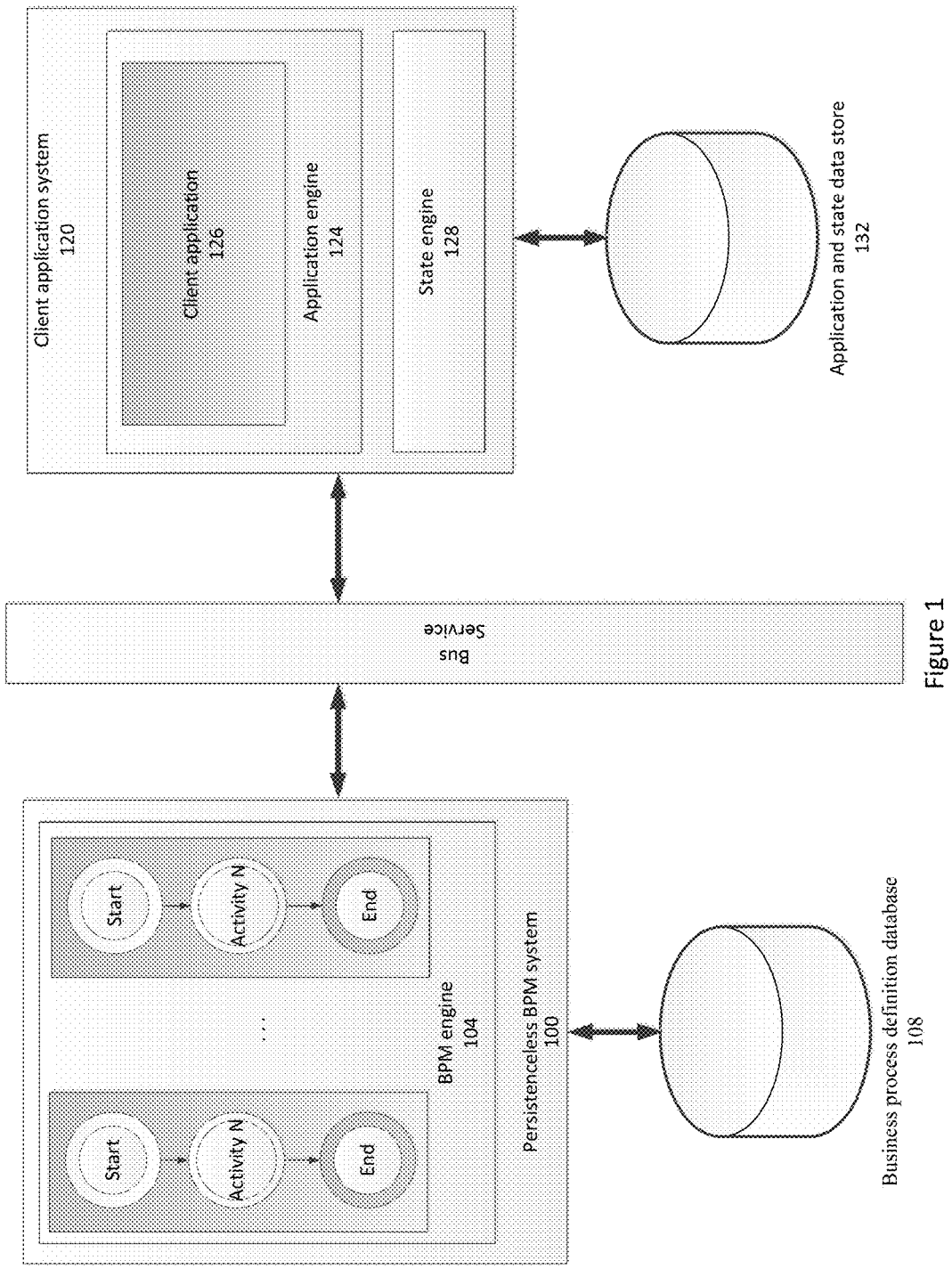
FIG. 1 depicts a Persistenceless BPM system in accordance with an embodiment of the present invention.

FIG. 1 depicts a Persistenceless BPM system 100 in accordance with an embodiment of the present invention. The Persistenceless BPM system 100 contains a BPM engine 104 and a business process definition database 108.

The BPM engine 104 of the BPM system 100 provides persistenceless BPM services to client applications. The BPM engine 104 may initialize instances of business processes deployed at the BPM system 100 based on business process definitions previously generated. The business process definitions, in one embodiment, may be stored at the business process definition database 108. As one example, the BPM engine 104 may be configured to automatically generate an instance of a business process for the validation of a net asset value of a portfolio starting at the beginning of a workday. In operation, at 9 am every weekday morning, the BPM engine 104 may automatically be triggered to generate an instance of the BPM process. In one embodiment, the process instances are maintained in memory at the BPM system 100 and the BPM engine 104 processes the business process instance data stored in memory in providing BPM services to clients in accordance with the business process definition.

The BPM engine 104 may automatically generate activities (i.e., tasks) for execution in accordance with the business process definition and interact with client applications to provide client applications with the generated activities. Therefore, after an instance of the net asset validation process definition has be initialized, the BPM engine 104 may automatically generate activities for execution related to the validation of the net asset value of a portfolio, such as collecting trades from the last trading period, reviewing corporate actions and validating financial statements.

The BPM engine 104 may provide BPM services in accordance with business process definition and the state of each business process instance. Thus, based on a change of business process state, such as the completion of an assigned task, the BPM engine 104 may automatically generate and distribute additional activities for execution by business members. For instance, the BPM engine 104 may interact with the client applications to provide the client applications with additional activities for business execution after one of the initial tasks related to validation of the net asset value (e.g., collecting trade data) has been completed.

In contrast to known BPM system, embodiments of the presently disclosed BPM system do not store or manage the persistence data at the BPM system but rather delegate the responsibility to external persistence stores managed by client-side applications. In particular, embodiments of the persistenceless BPM system 100 provide client applications with updated state information upon each state transaction (i.e., at each change in the state of the business process instance). In a preferred embodiment, the state information is communicated as part of the message flow between the BPM system 100 and client applications in the ordinary course. As discussed further below, the state information of each business process instance is stored at an application and state data store and managed by the client application. Furthermore, the state data stored thereat is updated with each state transaction message.

The activities and state information communicated from the BPM system 100 are received and processed by client applications. The BPM system 100 is shown in FIG. 1 to connect to a client application system 120 via a bus service. The client application system 100 contains an application engine 124, a state engine 128, and an application and state data store 132. Application engine 124 may execute and maintain a client application 126 that provides end-users with access to the business processes and services provided by the BPM system 100. The application engine 124 may also be configured to authenticate and authorize end-users, find available processes in a BPM directory, connect to BPM engines that are running those processes, and return instances information to end-users, along with other client-side BPM functions.

In one embodiment, the application engine 124 may execute and maintain a plurality of client applications, each of which may be configured to achieve different business goals. The application engine 124, therefore, may connect to a plurality of BPM engines at various BPM systems. While the systems depicted in FIG. 1 are shown to be connected to one another via a bus service, other services and/or connections may be utilized, including connections via wired or wireless networks. Furthermore, while the client application (s) and the BPM engine are depicted in FIG. 1 to operate in distinct systems, it should be apparent that in various embodiments, the components of the client application system and the BPM system may be contained within one or more computer systems.

The application engine 124 receives activities from the BPM system 100 and stores the activities at the application and state data store 132, along with business context data related to each activity. Thus, in a preferred embodiment, the business context data is stored at the business context application and state data store 132 and associated with the related tasks. For example, the application engine 124 may receive and store key attribute information related to each business task at the application and state data store 132, such as the Service Level Agreement (SLA) time, Red/Amber/Green (RAG) thresholds, recurrence patterns, Exception Management System (EMS) processes, required document types, notification requirements. Other business context information that may be stored includes information gathered from internal and external sources that may be necessary to complete the task, such as portfolio asset pricing, recent news developments, documents required to be filled out, and other information, as may be well known in the art.

The state engine 128 facilitates the receiving and processing of business process state data received from the BPM system 100 as part of the message flow between the BPM system 100 and the client applications. The state engine 128 may be further configured to store the state data at the application and state data store 132 and associate the state data with the corresponding business process instance data, such as pending activities and business context data. State engine 128 may also be configured to facilitate the communication of state information to the BPM system 100 in response to BPM system failure and recover.

Accordingly, responsibility for the maintenance and use of state persistence data is removed from the BPM system 100 and delegated to the client application system 120. Event message flow containing business process state data is communicated from BPM system 100 to the client applications in operation and processed to gather up-to-date process state information. As a result, the BPM system 100 is lighter, faster and more scalable. Furthermore, all data necessary to provide state information and business context for the pending and completed process instances reside in the same data store, making stored data more reliable and faster to retrieve. In addition, recoverability of operations is improved as there is no need for data reconciliation between two or more data stores. Overall, embodiments of the present invention improve system performance and scalability as many unnecessary costly operations are eliminated either partially or completely.

Figure 2A:
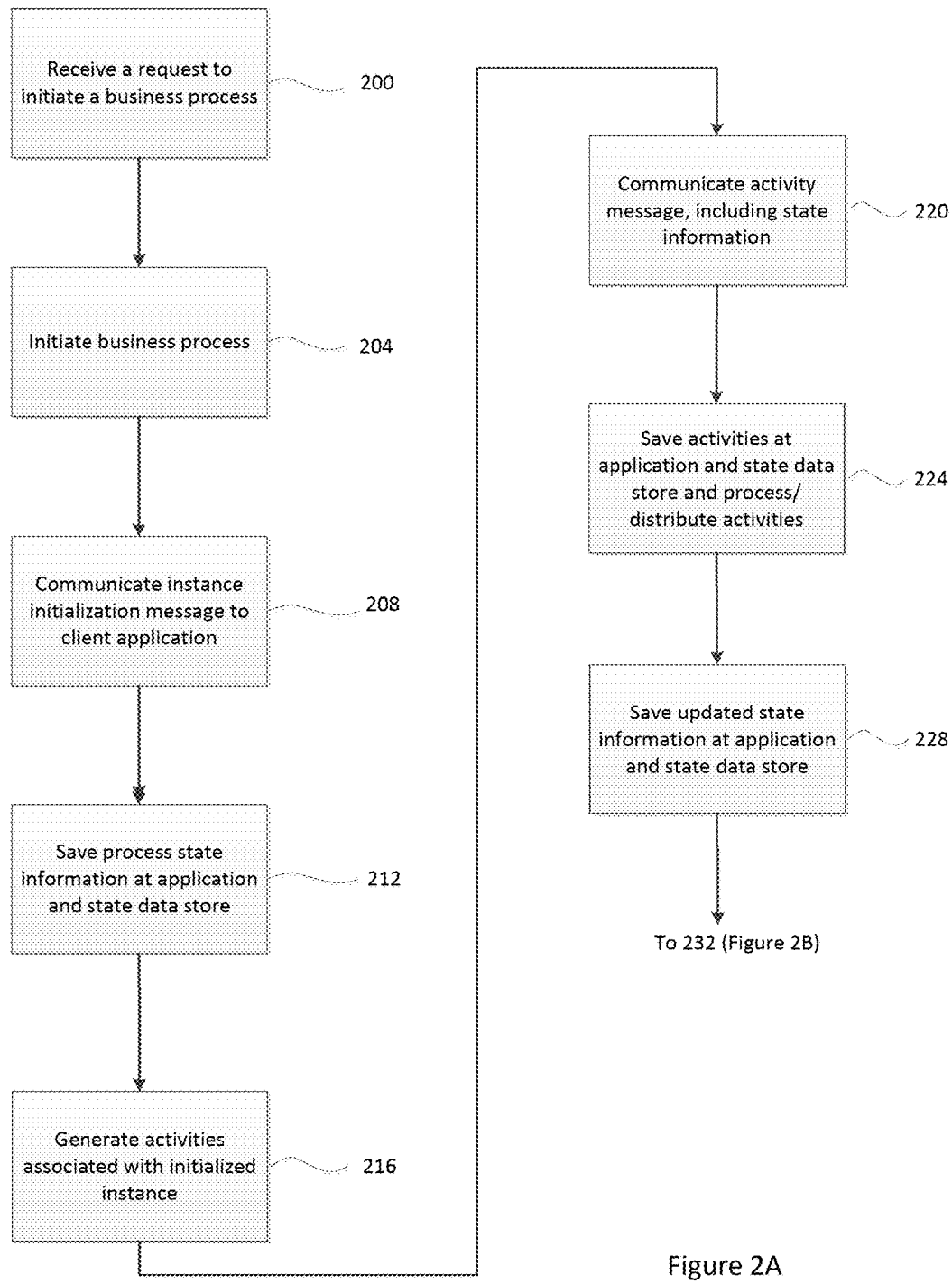
FIGS. 2A and 2B depict a flowchart of a method for maintaining state information in a persistenceless BPM system in accordance with an embodiment of the present invention.
Figure 2B:
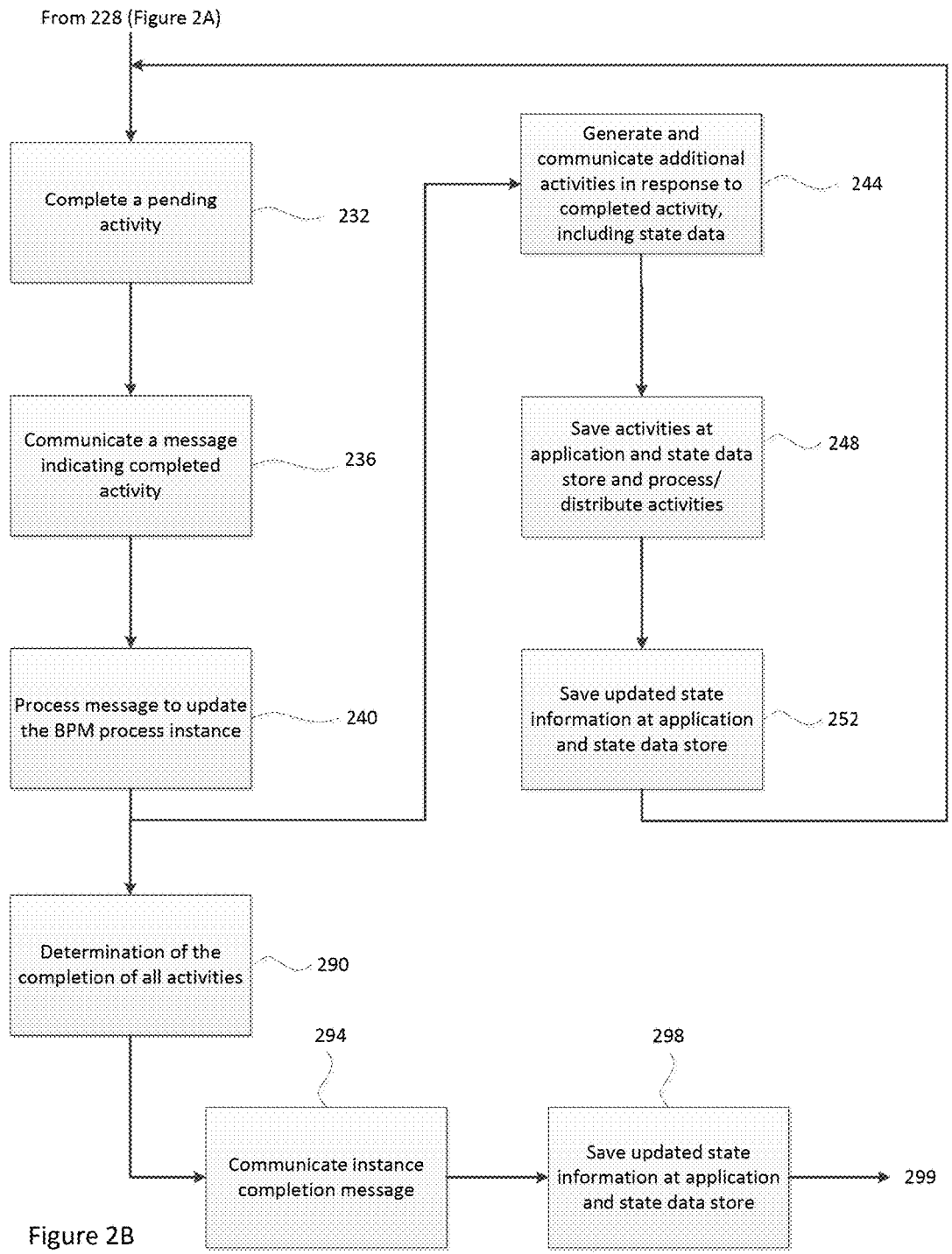

FIGS. 2A and 2B depict a flowchart of a method for maintaining state information in a persistenceless BPM system in accordance with an embodiment of the present invention. For exemplary purposes, the method will be discussed with reference to the BPM system 100 and client application system 120 of FIG. 1.

Figure 3:
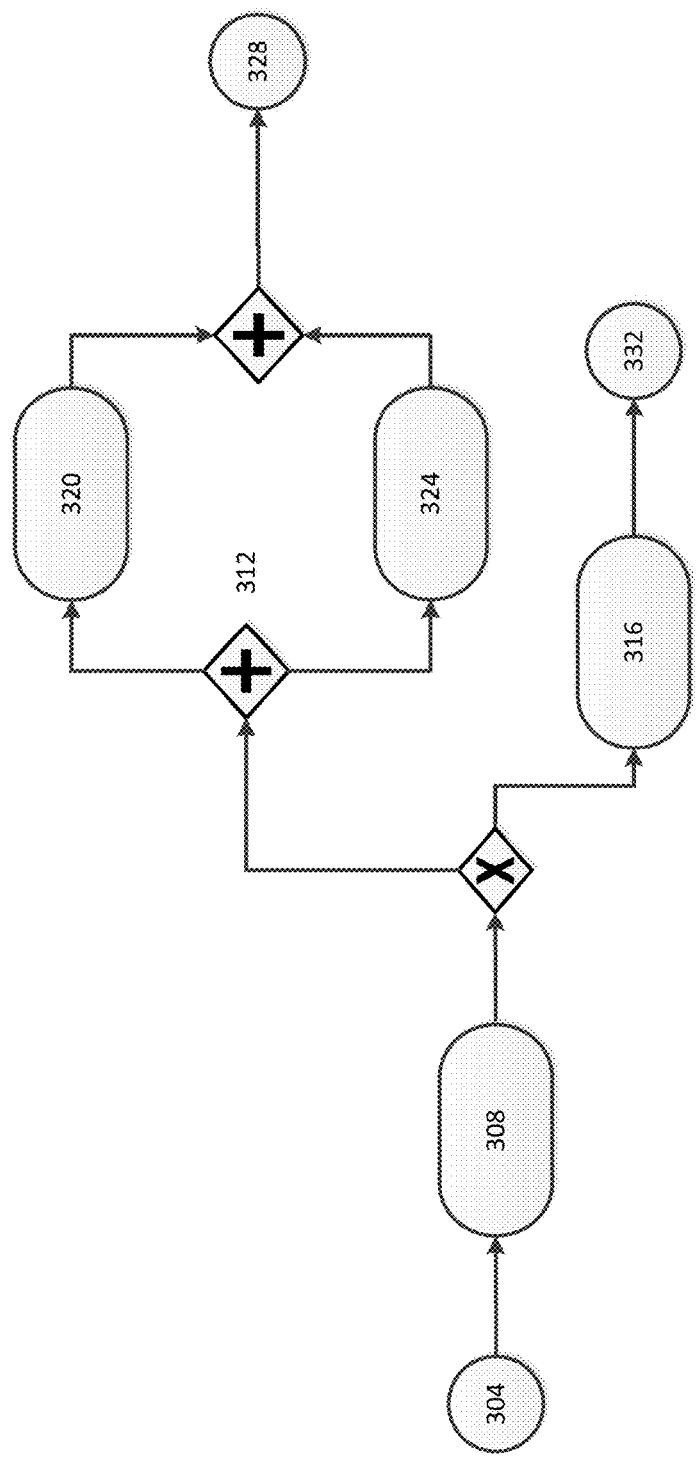
FIG. 3 depicts an exemplary business process in accordance with an embodiment of the present invention.

At 200, the client engine 124 generates a request to initiate a process instance based on a process definition that has been imported into the BPM system 100 previously, such as those stored in business process definition database 108. FIG. 3, for instance, depicts an exemplary business process for manually processing a personal check in accordance with an embodiment of the present invention. The business process 300 is triggered by a start event 304. For example, the business process may be triggered upon the receiving of a personal check deposit at a bank a request for a manual processing of the personal check. Thus, upon the detection of the event, the client application responsible for validating personal checks may generate a request to initiate an instance of the business process 300 at the BPM system 100. At activity node 308, the checking account number on the check is processed to determine whether the account number corresponds to a valid checking account. Where it is determined that the account number is valid, the process continues on to parallel gateway 312, where the transaction data entry on the check is processed against the account information at node 320, and the signature is processed against account records at 324. These activity nodes, as indicated by the parallel gateway 312, may be executed in parallel. Upon the successful execution of activities corresponding to nodes 320 and 324, the check validation process is complete and the event node 328 is reached. Where it is determined that the account number is not valid, however, then a fraud and error inquiry is opened and the process ends at event node 332.

At 204, the BPM system 100 initiates an instance of the business process definition. As part of the initialization process, the BPM system 100 may generate a unique process identifier, such as a Process ID, to be associated with the initialized process definition instance. This Process ID may be utilized to identify the business process instance at the BPM system 100 and at client application system 120. At 208, the BPM system 100 sends an initialization message with the Process ID generated at the BPM system 100 to the client application system 120, whereupon it is received and processed by the application engine 120. In one embodiment, the initialization message further contains the business process definition that details all activities of the business process and their relationships. The initialization message may be communicated to the application system 120 as part of an event message flow between the BPM system 100 and application system 120 in the ordinary course and may contain other data ordinarily communicated between the BPM system 100 and application system 120, as may be well known in the art.

At 212, the process state information is saved at the application and state data store 132. For example, application and state data store 132 may contain information indicating that a business process flow associated with the personal check processing business process (illustrated in FIG. 3) has been initiated. The process state information may contain time and date of the latest process instance state change and may further contain a historical log of each state transaction.

At 216, subsequent to initializing an instance of the business process definition, the BPM system 100 generates activities associated with the initialized instance and communicates the activities to the application system 120 for execution. At 220, a message is sent to the application system 120 containing at least one activity to be executed. In one preferred embodiment, a message is sent to the client application system 120 for each activity generated at the BPM system 100. Along with activity information, each message may further contain state information. Thus, a message may be communicated from the BPM system 100 to the client application system 120 containing an activity relating to the validation of an account number (as modeled and depicted as activity node 308 of FIG. 3). The message may further indicate that the state of the business process instance should be updated to reflect this pending activity.

At 224, the activity described in the message may be stored at the application and state data store 132. The activity message may further contain the Process ID, thereby allowing the business application to determine that the activity is associated with the messages previously received. The Process ID may be utilized as a unique key in the data store 132 to identify all data associated with the business process instance. In a preferred embodiment, the activity data stored at the application and state data store 132 is further associated with the state information previously received. At 228, the state information stored at the application and state data store 132 is updated to include the latest message and change in state. By accessing the application and state data store 132, the client application 126 may automatically determine not only the activities associated with a business process instance, but also quickly determine the state of the business process instance.

Business context information associated with the business process instance and the associated activities may also be stored at the application and state data store 132. In a preferred embodiment, at least some of the business context information is defined by business architects using terminals connected to the BPM system 100.

At 232, a business member may execute and complete a pending activity. The business member may indicate the results of the activity and describe any additional information that may be required. A business member, for example, may utilize a terminal connected to application system 120 to update the status of the task corresponding to activity node 308 (i.e., validate account number) to indicate that the account number on the check is valid. At 236, in response to the update inputted by the business member, a message is communicated from the application system 120 to the BPM system 100, indicating the change in the status of a particular task—in this case, the completion of activity node 308.

At 240, BPM system 100 updates the state of the BPM business process instance in response to the message received. In this example, the BPM system 100 determines that activity node 308 has been completed and that the next processes to execute are activities corresponding to nodes 320 and 324 (as illustrated in FIG. 3). Accordingly, the BPM system 100, at 244, generates an additional activities corresponding to nodes 320 and 324 and communicates to the client application system 120 messages containing the additionally generated activities, along with updated state information. For example, the messages may further contain data indicating that the activity corresponding to node 308 has been completed and the activities corresponding to nodes 320 and 324 have been created and are pending.

At 248, the application system 120 receives the messages and updates the application and state data store 132 with the new activities. Application system 120, at 252, further updates the state information at the application and state data store 132 in accordance with the state transaction information included in the messages.

As indicated by FIG. 2B, the BPM system 100 and application system 120 continues in this fashion to: receive indication of completed activities from business members (at 232/236), cause the updating of the business process in response at the BPM system (at 240), generate additional activities in response to change in statuses of the activities (at 244), and receive and process these generated tasks for execution (at 248/252), all the while communicating to and storing state information at the client application system 120. This may repeat until the completion of the business process as a whole. At 290, all of the activities of the business process may be deemed to have been completed by the BPM system 100, whereupon, at 294, the BPM system 100 notifies to the client application of the completed state of the business process instance. At 298, in response to the received completion message, the process state is updated to reflect the completion of the business process. The method ends at 299.

Figure 4A:
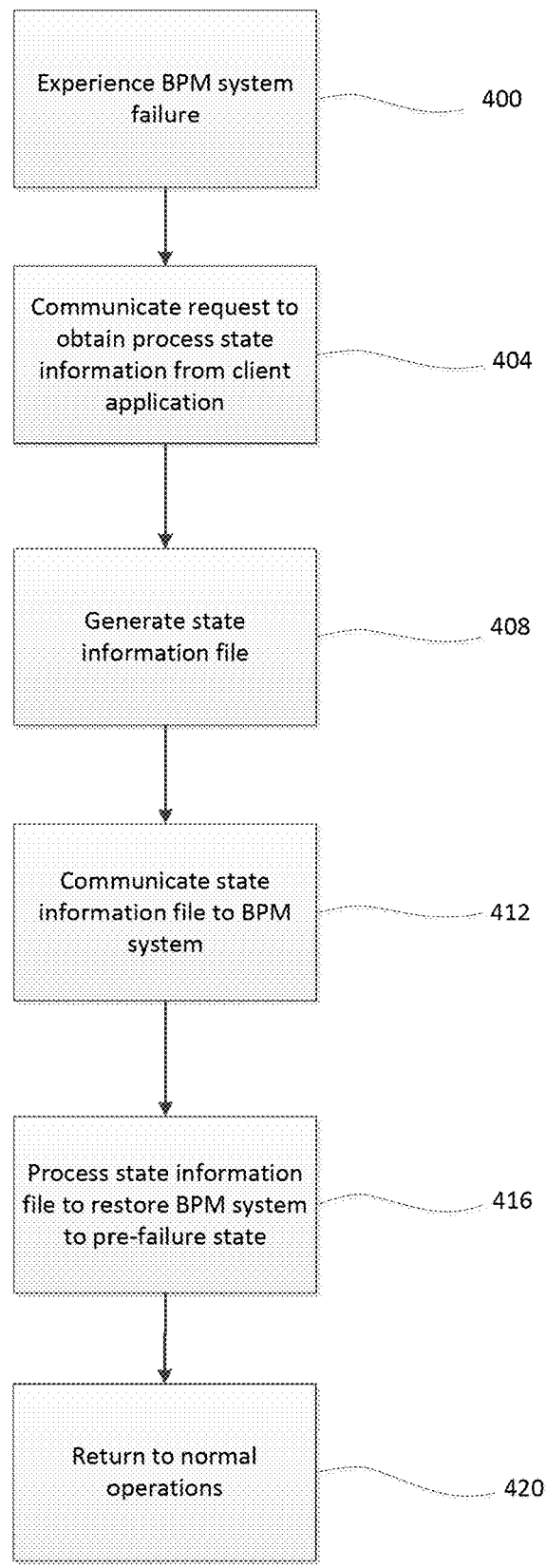
FIG. 4A depicts a flowchart of a method for recovering system operations upon system failure at a persistenceless BPM system in accordance with an embodiment of the present invention.

FIG. 4A depicts a flowchart of a method for recovering system operations upon system failure at a persistenceless BPM system in accordance with an embodiment of the present invention. At 400, the BPM system may fail and may not have business process instance data loaded in memory. For example, components of the BPM system 100, such as portions of its memory, may have malfunctioned or failed. In another instance, the BPM system 100 may have crashed entirely, causing its memory to reset. In yet other instances, execution or processing errors may have caused the business process instance data in memory to be compromised or become unreliable. Such BPM system failure may automatically be detected at 400 and may be detected in manners known in the art.

Using the business process workflow 300 again as an example, the BPM system 100 that is executing the business process 300 may experience a system failure at 400. For example, BPM system 100 may have failed after step 248 of FIG. 2, where the activity corresponding to node 308 has been completed and activities corresponding to nodes 320 and 324 are pending.

At 404, upon the detection of the BPM system 100 failure at 400, the BPM system 100 may automatically initiate a restoration request to obtain the process state information from the client application. Where the BPM system 100 is configured to operate with a plurality of client applications, the BPM system 100 may automatically communicate the restoration request messages to each of the client applications.

At 408, in response to the restoration request message, the state engine 124 of the client application system 120 may automatically generate a state information file for communication to the BPM system 100. The state information file may contain state data of all active business process instances managed by BPM system 100 or may contain business process instances indicated by the request. In one embodiment, the state information file generated by the state engine is a markup language-based file (e.g., XML file) or a text-based file. Various other file types may be utilized in other embodiments.

At 412, the state information file is communicated from the client application system 120 to the BPM system 100. In response, at 416, the BPM system 100 processes the state information file to restore the BPM system 100 to its state just prior to the crash at 400. In the example used here, the BPM system 100 may restore the BPM engine 100 such that the activity associated with node 308 has been indicated as being completed and the activities associated with nodes 320 and 324 are indicated as pending.

Figure 4B:
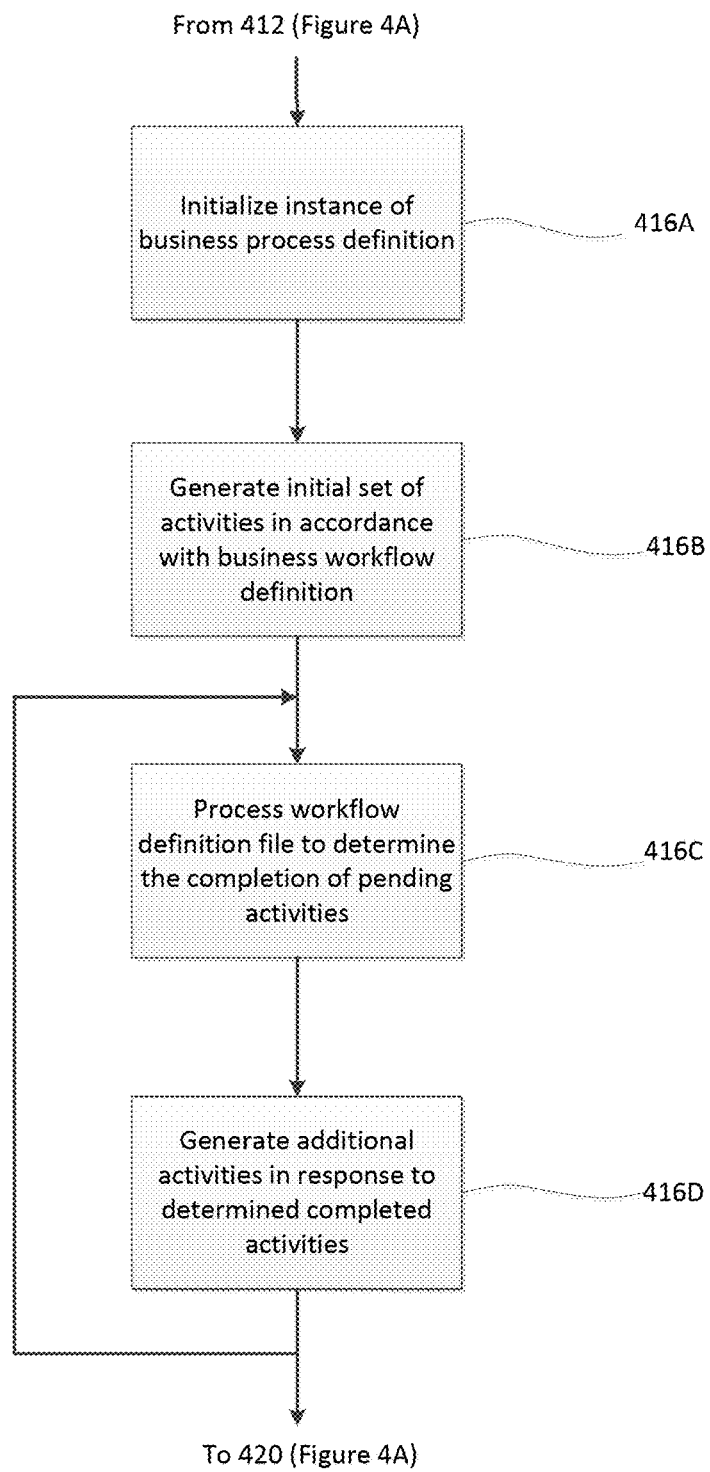
FIG. 4B depicts a flowchart of a method of BPM system recovery using a replay process in accordance with an embodiment of the present invention.

In a preferred embodiment, the BPM system 100 processes the state information file to replay the process instance to the exact state indicated by the application engine 120. Upon processing the state information file, the BPM system 100 may determine that there was an instance of the workflow definition 300 active at the BPM system 100. Thus, in one embodiment illustrated in FIG. 4B, the BPM system 100 initializes an instance of a business workflow definition at 416a in response to receiving the state information file.

At 416b, BPM system 100 generates the initial set of activities in accordance with the business workflow definition corresponding to the initialized process instance state data. In this example, BPM system 100 may generate an activity corresponding to node 308. At 416c, the BPM system 100 processes the workflow definition file to determine the completion of any of the active activities in the initial set of activities. The PBM system 100 may determine from the state information file that the activity corresponding to node 308 was completed. At 416d, the BPM system generates activities in response to completed activities. Thus, BPM system 100 may generate activities corresponding to activity nodes 320 and 324 in response to determining that the activity corresponding to node 308 was completed previously and it was previously determined that the account number was valid. The BPM system 100 may continue to generate additional activities and process the workflow definition file to determine their completion statuses until the entire workflow definition file has been processed. In this fashion, the BPM system 100 may effectively "replay" the process instance up until and just prior to BPM system failure. At 420, at the complete processing of the workflow definition file, the state recovery procedure is completed and the BPM system 100 returns to operate normally.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or may include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At minimum, the memory includes at least one set of instructions that are either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The computer 400 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, RUM and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or nonremovable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memories may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communication protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Accordingly, embodiments of the present invention allow for the defining and configuring of business process definitions that are easily configurable by business-oriented users, such as business architects. Participation by IT teams is minimized, thereby reducing costs and potential for errors. As will be further evident, the use of work profiles allows business architects to define business processes without defining every step and related attribute within the process prior to execution, saving additional time and cost.

Although many other internal components of the computer are not shown, those of ordinary skill in the art will appreciate that such components and the interconnections are well known. Accordingly, additional details concerning the internal construction of the computer need not be disclosed in connection with the present invention. The various embodiments and features of the presently disclosed invention may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents. While particular embodiments of the invention have been illustrated and described in detail herein, it should be understood that various changes and modifications might be made to the invention without departing from the scope and intent of the invention. From the foregoing it will be seen that this invention is one well adapted to attain all the ends and objects set forth above, together with other advantages, which are obvious and inherent to the systems and methods. It will be understood that certain features and sub-combinations are of utility and may be employed without reference to other features and sub-combinations.

The invention claimed is:

1. A persistenceless business process management (BPM) computing device, comprising memory comprising programmed instructions stored thereon and one or more processor configured to execute the stored programmed instructions to:
  communicate an initialization message to a client application device via one or more communication networks subsequent to initializing a business process instance, the initialization message comprising first state data to be stored at an application and state data store of the client application device;
  generate a first activity for execution in accordance with the initialized business process instance and communicate, via the communication networks, a first activity message comprising an indication of the first activity and second state data to the client application device to be stored at the application and state data store;
  detect a system failure and automatically communicate, via the communication networks, a restoration request message to the client application device in response to the detected system failure;
  receive, via the communication networks and in response to the restoration request message, an automatically generated restoration state information file comprising the first state data and the second state data from the client application device; and extract the first state data and the second state data from the received restoration state information file and restore the business process instance in accordance with the extracted first state data and the second state data.

2. The persistenceless BPM computing device of claim 1, wherein the communication networks comprise one or more bus services, wired networks, or wireless networks.

3. The persistenceless BPM computing device of claim 1, wherein the processors are further configured to execute the stored program instructions to:
receive a completion message indicating the completion of the first activity;
generate a second activity for execution in response to the completion message indicating the completion of the first activity and in accordance with the business process instance;
communicate, via the communication networks, a second activity message to the client application device comprising an indication of the second activity and third state data to be stored at the application and state data store.

4. The persistenceless BPM computing device of claim 3, wherein the processors are further configured to execute the stored programmed instructions to restore the business process instance in accordance with the third state data.

5. The persistenceless BPM computing device of claim 1, wherein the processors are further configured to execute the stored programmed instructions to replay the processing of the business process instance in accordance with the business process definition and restoration state information included in the restoration state file.

6. The persistenceless BPM computing device of claim 5, wherein the processors are further configured to execute the stored programmed instructions to:
reinitialize the business process instance in accordance with a business process definition; and
generate one or more activities for execution in accordance with the initialized business process instance;
process the business process restoration state information to determine the completion of the generated activities, and until a state of the reinitialized business process instance matches another state of the business process instance just prior to the system failure:
generate one or more additional activities in accordance with the business process definition in response to the completion of generated activities; and
process the business process restoration state information to determine the completion of the generated additional activities.

7. A method for persistenceless business process management (BPM) with improved system recovery and processor and bandwidth utilization, the method implemented by one or more BPM computing devices and comprising:
communicating an initialization message to a client application device via one or more communication networks subsequent to initializing a business process instance, the initialization message comprising first state data to be stored at an application and state data store of the client application device;
generating a first activity for execution in accordance with the initialized business process instance and communicating, via the communication networks, a first activity message comprising an indication of the first activity and second state data to the client application device to be stored at the application and state data store;
detecting a system failure and automatically communicating, via the communication networks, a restoration request message to the client application device in response to the detected system failure;
receiving, via the communication networks and in response to the restoration request message, an automatically generated restoration state information file comprising the first state data and the second state data from the client application device; and
extracting the first state data and the second state data from the received restoration state information file and restoring the business process instance in accordance with the extracted first state data and the second state data.

8. The method of claim 7, wherein the communication networks comprise one or more bus services, wired networks, or wireless networks.

9. The method of claim 7, further comprising:
receiving a completion message indicating the completion of the first activity;
generating a second activity for execution in response to the completion message indicating the completion of the first activity and in accordance with the business process instance;
communicating, via the communication networks, a second activity message to the client application device comprising an indication of the second activity and third state data to be stored at the application and state data store.

10. The method of claim 9, further comprising restoring the business process instance in accordance with the third state data.

11. The method of claim 7, further comprising replaying the processing of the business process instance in accordance with the business process definition and restoration state information included in the restoration state file.

12. The method of claim 11, further comprising:
reinitializing the business process instance in accordance with a business process definition;
generating one or more activities for execution in accordance with the initialized business process instance; and
processing the business process restoration state information to determine the completion of the generated activities, and until a state of the reinitialized business process instance matches another state of the business process instance just prior to the system failure:
generating one or more additional activities in accordance with the business process definition in response to the completion of generated activities; and
processing the business process restoration state information to determine the completion of the generated additional activities.

13. A non-transitory computer readable medium having instructions stored thereon for persistenceless business process management (BPM) with improved system recovery and processor and bandwidth utilization comprising executed code that, when executed by one or more processors, causes the processors to:
communicate an initialization message to a client application device via one or more communication networks subsequent to initializing a business process instance, the initialization message comprising first state data to be stored at an application and state data store of the client application device;

generate a first activity for execution in accordance with the initialized business process instance and communicate, via the communication networks, a first activity message comprising an indication of the first activity and second state data to the client application device to be stored at the application and state data store;

detect a system failure and automatically communicate, via the communication networks, a restoration request message to the client application device in response to the detected system failure;

receive, via the communication networks and in response to the restoration request message, an automatically generated restoration state information file comprising the first state data and the second state data from the client application device; and extract the first state data and the second state data from the received restoration state information file and restore the business process instance in accordance with the extracted first state data and the second state data.

14. The non-transitory computer readable medium of claim 13, wherein the communication networks comprise one or more bus services, wired networks, or wireless networks.

15. The non-transitory computer readable medium of claim 13, wherein the executable code, when executed by the processor, further causes the processors to:

receive a completion message indicating the completion of the first activity;

generate a second activity for execution in response to the completion message indicating the completion of the first activity and in accordance with the business process instance;

communicate, via the communication networks, a second activity message to the client application device comprising an indication of the second activity and third state data to be stored at the application and state data store.

16. The non-transitory computer readable medium of claim 15, wherein the executable code, when executed by the processor, further causes the processors to restore the business process instance in accordance with the third state data.

17. The non-transitory computer readable medium of claim 13, wherein the executable code, when executed by the processor, further causes the processors to replay the processing of the business process instance in accordance with the business process definition and restoration state information included in the restoration state file.

18. The non-transitory computer readable medium of claim 13, wherein the executable code, when executed by the processor, further causes the processors to:

reinitialize the business process instance in accordance with a business process definition;

generate one or more activities for execution in accordance with the initialized business process instance; and process the business process restoration state information to determine the completion of the generated activities, and until a state of the reinitialized business process instance matches another state of the business process instance just prior to the system failure:

generate one or more additional activities in accordance with the business process definition in response to the completion of generated activities; and process the business process restoration state information to determine the completion of the generated additional activities.

* * * * *